(12) United States Patent
Tian et al.

(10) Patent No.: US 10,072,938 B2
(45) Date of Patent: Sep. 11, 2018

(54) METHOD AND SYSTEM FOR DETERMINING AND PROVIDING A PERSONALIZED ETA WITH PRIVACY PRESERVATION

(71) Applicant: Bayerische Motoren Werke Aktiengesellschaft, Munich (DE)

(72) Inventors: Jilei Tian, Chicago, IL (US); Kasthuri Rengan Nallappa Soundararajan, Schaumburg, IL (US); Yang Cao, Beijing (CN); Xiaogang Yang, Beijing (CN); Alvin Chin, Chicago, IL (US); Clint Woker, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/142,264

(22) Filed: Apr. 29, 2016

(65) Prior Publication Data
US 2017/0314950 A1    Nov. 2, 2017

(51) Int. Cl.
*G01C 21/34* (2006.01)
*G01C 21/36* (2006.01)
(Continued)

(52) U.S. Cl.
CPC ..... *G01C 21/3484* (2013.01); *G01C 21/3492* (2013.01); *G01C 21/365* (2013.01);
(Continued)

(58) Field of Classification Search
CPC ........ G01C 21/00; G01C 21/20; G01C 21/26; G01C 21/34; G01C 21/3453;
(Continued)

(56) References Cited

U.S. PATENT DOCUMENTS 6,144,917 A * 11/2000 Walters ............ G08G 1/096827
340/988
6,317,686 B1 * 11/2001 Ran ..................... G01C 21/3691
701/117

(Continued)

FOREIGN PATENT DOCUMENTS

| JP | 2014235054 A | * 12/2014 | |
| WO | WO 2010075875 A1 | * 7/2010 | ......... G01C 21/3407 |
| WO | WO 2016162781 A1 | * 10/2016 | |

*Primary Examiner* — Behrang Badii
*Assistant Examiner* — David A Testardi
(74) *Attorney, Agent, or Firm* — Crowell & Moring LLP (57) ABSTRACT

The disclosure is directed to improving driving experience by determining and providing a personalized estimated time of arrival (ETA). For example, using at least one computing device, driving data associated with a user may be collected and stored in memory. The at least one computing device may also be used to receive ETA-related data including one or more real time ETA estimations, perform analysis on one or more of the driving data and the ETA-related data so as to determine a set of personalized parameters of a mapping function that correspond to a training set. The at least one computing device may also be used to determine the personalized ETA based at least in part on the determined set of personalized parameters and provided to the user.

13 Claims, 6 Drawing Sheets

(51) Int. Cl.
 *G07C 5/08* (2006.01)
 *G06F 21/62* (2013.01)
 *G06F 17/30* (2006.01)
(52) U.S. Cl.
 CPC ... *G01C 21/3697* (2013.01); *G06F 17/30241* (2013.01); *G06F 17/30528* (2013.01); *G06F 17/30551* (2013.01); *G06F 21/6218* (2013.01); *G07C 5/0841* (2013.01)
(58) Field of Classification Search
 CPC ............ G01C 21/3484; G01C 21/3641; G01C 21/365; G01C 21/3697; G01C 21/3492; G01C 21/3691
 USPC .......................................................... 701/465
 See application file for complete search history.

(56) References Cited

U.S. PATENT DOCUMENTS

| | | | | |
|---|---|---|---|---|
| 6,490,519 | B1* | 12/2002 | Lapidot | G01C 21/34 340/905 |
| 6,611,754 | B2* | 8/2003 | Klein | G08G 1/096827 701/424 |
| 7,739,031 | B2* | 6/2010 | Tengler | G01C 21/3626 701/465 |
| 8,452,529 | B2* | 5/2013 | Alten | G01C 21/3484 701/117 |
| 8,712,682 | B1* | 4/2014 | Liu | G01C 21/3415 701/400 |
| 2010/0110944 | A1* | 5/2010 | Shibasaki | G01C 21/26 370/282 |
| 2010/0217519 | A1* | 8/2010 | Englerth | G01C 21/3492 701/465 |
| 2010/0302070 | A1* | 12/2010 | Puckett | G08G 1/0104 340/933 |
| 2011/0160988 | A1* | 6/2011 | Rogers | G08G 1/0104 701/119 |
| 2011/0161001 | A1* | 6/2011 | Fink | G01C 21/3492 701/533 |
| 2011/0231091 | A1* | 9/2011 | Gourlay | G08G 1/096811 701/465 |
| 2015/0032366 | A1* | 1/2015 | Man | H04W 4/046 701/412 |
| 2015/0066360 | A1* | 3/2015 | Kirsch | G01C 21/3688 701/438 |
| 2015/0160023 | A1* | 6/2015 | Goel | G08G 1/0112 701/400 |
| 2015/0350840 | A1 | 12/2015 | Pham et al. | |
| 2016/0216123 | A1* | 7/2016 | Liao | G01C 21/3484 |
| 2017/0138751 | A1* | 5/2017 | Martyniv | G01C 21/20 |

* cited by examiner

| Day of Week | Start | End | Actual Driving Time | ETA |
|---|---|---|---|---|
| Monday | 7:30 | 8:09 | 0:39 | 0:31 |
| Thursday | 7:43 | 8:27 | 0:44 | 0:34 |
| Thursday | 7:24 | 7:53 | 0:29 | 0:25 |
| Monday | 7:44 | 8:33 | 0:49 | 0:37 |
| Monday | 7:37 | 8:22 | 0:45 | 0:31 |
| Tuesday | 7:28 | 8:08 | 0:40 | 0:34 |
| Tuesday | 7:08 | 7:52 | 0:44 | 0:30 |
| Tuesday | 8:30 | 9:18 | 0:48 | 0:40 |
| Monday | 8:28 | 9:15 | 0:47 | 0:39 |
| Wednesday | 7:30 | 9:13 | 0:43 | 0:37 |
| Thursday | 8:01 | 8:49 | 0:48 | 0:41 |
| Thursday | 7:09 | 7:44 | 0:35 | 0:28 |
| Thursday | 8:01 | 8:42 | 0:41 | 0:37 |

| Actual Driving Time (ADT) | ETA | Time Error of ETA abs (ETA-ADT) | Personal ETA | Time Error of Personal ETA abs (p. ETA-ADT) |
|---|---|---|---|---|
| 0:39 | 0:31 | 0:08 | 0:37 | 0:02 |
| 0:44 | 0:34 | 0:10 | 0:42 | 0:02 |
| 0:29 | 0:25 | 0:04 | 0:29 | 0:00 |
| 0:49 | 0:37 | 0:12 | 0:46 | 0:03 |
| 0:45 | 0:31 | 0:14 | 0:37 | 0:08 |
| 0:40 | 0:34 | 0:06 | 0:42 | 0:02 |
| 0:44 | 0:30 | 0:14 | 0:36 | 0:08 |
| 0:48 | 0:40 | 0:08 | 0:50 | 0:02 |
| 0:47 | 0:39 | 0:08 | 0:49 | 0:02 |
| 0:43 | 0:37 | 0:06 | 0:46 | 0:03 |
| 0:48 | 0:41 | 0:07 | 0:52 | 0:04 |
| 0:35 | 0:28 | 0:07 | 0:33 | 0:02 |
| 0:41 | 0:37 | 0:04 | 0:46 | 0:05 |

METHOD AND SYSTEM FOR DETERMINING AND PROVIDING A PERSONALIZED ETA WITH PRIVACY PRESERVATION

BACKGROUND ART

The invention relates to personalizing and tailoring ETA information to a specific user based on driving data associated with the user, such as driving habits, driving tendencies, driving preferences, vehicle conditions, etc. For instance, a "personalized" ETA may be provided to the user by determining the personalized parameters of a mapping function.

Estimated Time of Arrival ("ETA") is a measure of time when a vehicle, for example, is expected to arrive at a particular destination. ETA may be an important piece of information that a user, such as a driver or a passenger of the vehicle, may use to plan a trip. ETA information may also be updated at various points during the trip so as to allow the user to update travel plans accordingly along the way.

ETA related services may be provided by various map, location, or traffic applications. These applications may use different types of data and information to determine ETA. For example, ETA may be based on: (1) "static" data, or more generally, data associated with a map (e.g., route, distance, speed limit, traffic light positions and patterns, road geometry, turns, etc.), (2) "dynamic" data, or more generally, data associated with real-time traffic (e.g., incidents, accidents, weather, traffic, traffic flow rates, etc.), and/or (3) "crowd-sourcing" data, or more generally, data from numerous different users (e.g. taxis, private vehicles, drivers, passengers, etc.).

However, the above-noted applications may provide the same ETA information for many different users. In other words, the ETA information may be estimated regardless of user identity. In that regard, there is a need to determine ETA based on driving data associated with the user in order to provide more precise and more personalized ETA to the user while simultaneously preserving user privacy and sensitive user data.

SUMMARY OF THE INVENTION

According to one example of the present disclosure, a method for determining and providing a personalized estimated time of arrival (ETA) is provided. The method includes collecting, using at least one computing device, driving data associated with a user including one or more actual driving times from a first geographical location to a second geographical location via a route, and storing, using the at least one computing device, the driving data in memory. The method also includes receiving, using the at least one computing device, ETA-related data including one or more real time ETA estimations and performing, using the at least one computing device, analysis on one or more of: the driving data and the ETA-related data so as to determine a set of personalized parameters of a mapping function that correspond to a training set. The method also includes determining, using the at least one computing device, the personalized ETA based at least in part on the determined set of personalized parameters, and providing, by the at least one computing device, the personalized ETA to the user.

According to another example of the present disclosure, a non-transitory computer-readable medium including a set of executable instructions is provided. The set of executable instruction when executed by at least one processor causes the at least one processor to perform a method for determining and providing a personalized estimated time of arrival (ETA), where the method includes collecting driving data associated with a user including one or more actual driving times from a first geographical location to a second geographical location via a route and storing the driving data in memory. The method also includes receiving ETA-related data including one or more real time ETA estimations and performing analysis on one or more of: the driving data and the ETA-related data so as to determine a set of personalized parameters of a mapping function that correspond to a training set. The method also includes determining the personalized ETA based at least in part on the determined set of personalized parameters and providing the personalized ETA to the user.

According to yet another example of the present disclosure, a system for determining and providing a personalized estimated time of arrival (ETA) is provided. The system may include memory and at least one computing device executing stored program instructions to collect driving data associated with a user including one or more actual driving times from a first geographical location to a second geographical location via a route and store the driving data in the memory. The at least one computing device also executes the stored program instructions to receive ETA-related data including one or more real time ETA estimations and perform analysis on one or more of: the driving data and the ETA-related data so as to determine a set of personalized parameters of a mapping function that correspond to a training set. The at least one computing device also executes the stored program instructions to determine the personalized ETA based at least in part on the determined set of personalized parameters and provide the personalized ETA to the user.

Other objects, advantages and novel features of the present invention will become apparent from the following detailed description of one or more preferred embodiments when considered in conjunction with the accompanying drawings.

DETAILED DESCRIPTION OF EMBODIMENTS OF THE INVENTION

The present disclosure is directed to determining and providing personalized ETA with privacy preservation. For example, driving data associated with a user, such as the user's driving behavior, habits, and/or tendencies, vehicle conditions, as well as information from various sensors of the vehicle may be collected and stored. Together with ETA related information provided by third party services, such as real-time ETA estimations, the collected driving data may then be used to analyze and determine a personalized ETA while being able to preserve user privacy and any data identifying the user.

In one aspect of the disclosure, a personalized user profile may be created based on driving data associated with the user. By way of example only, the data may include information on whether the user prefers to drive in one lane over a different lane, whether the user prefers one route to a particular destination over a different route, information that the user drives faster on a specific road segment compared to a different road segment, etc. Other data corresponding to information received from vehicle sensors, such as speed sensors, engine sensors, image sensors, etc., associated with the user's driving may also be part of the personalized user profile.

In another aspect of the disclosure, the data corresponding to the personalized user profile and ETA related information acquired from third party services may be mapped onto each other to determine and provide the personalized ETA. For instance, the mapping may be non-linear, and thus, a mapping function, such as a model-predicted ETA for example, may be used. By way of example, the mapping function may include one or more personalized parameters, which may be optimized over a predetermined number of iterations so that the numerical mismatches between the model-predicted ETA times and actual driving times are minimized as much as possible. This may be based on, for example, a training data set. After the personalized parameters have been determined, they may be used to determine and provide the personalized ETA.

In yet another aspect of the disclosure, any data associated with the user, including data that may reveal the user's identity and/or any other information intended to be kept private, may be protected by a proxy gateway via a proxy server. The proxy gateway, for instance, may be configured to anonymize user identity while establishing communication with third party services to obtain ETA related information, such as real-time ETA estimations, GPS information, and information on traffic flow, accidents, incidents, speed limits, road geometry, crowd-sourced data, etc.

The present disclosure may be implemented on one or more computing devices. For example, a driver may use a mobile computer, such as a smartphone, to launch and run an application that provides the user a personalized ETA. In another example, an in-vehicle computer of a vehicle may launch and run the application. In a further example, the application may run on both the smartphone and in-vehicle computer, simultaneously. Moreover, the ETA and related information may be outputted via a display, such as a smartphone display, a head-up display, etc.

Figure 1:
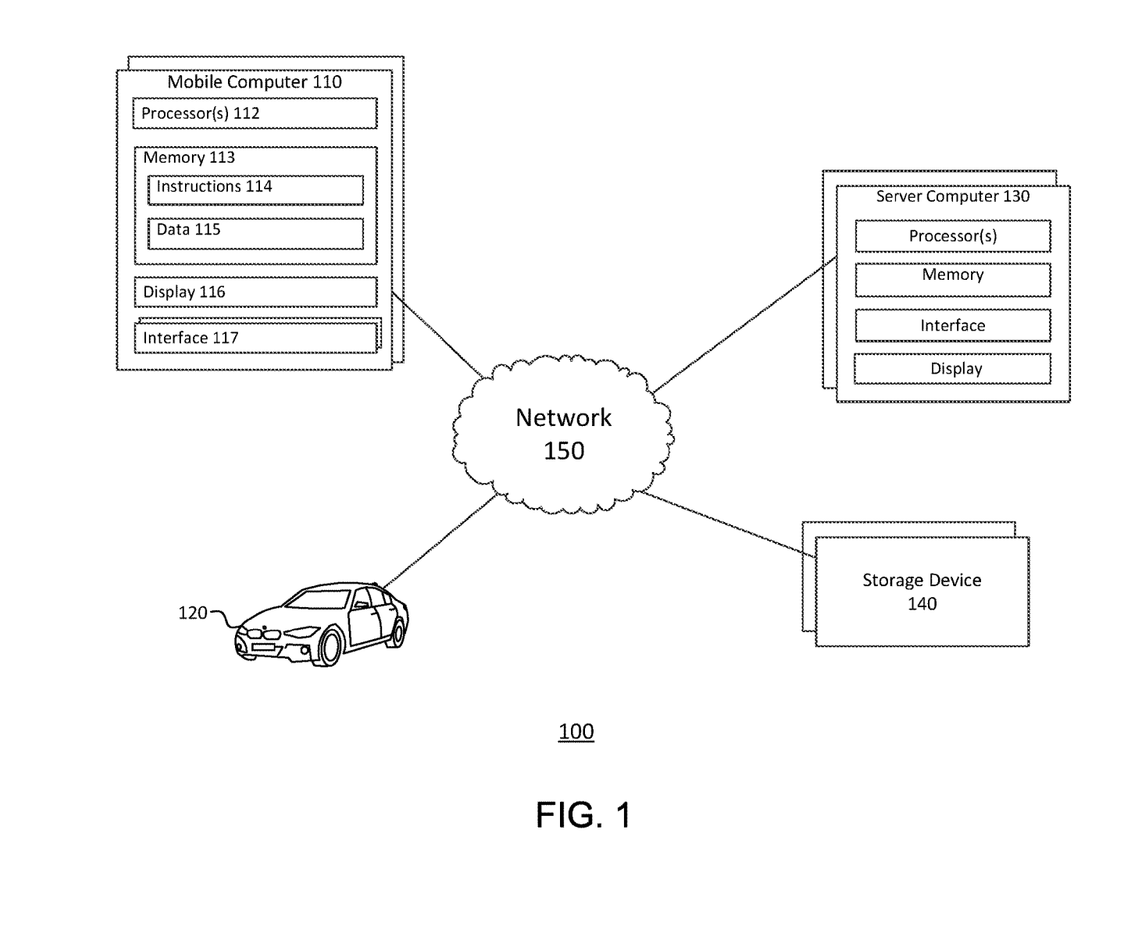
FIG. 1 illustrates a system in accordance with one or more aspects of the disclosure.

FIG. 1 illustrates an example of a system 100 in accordance with one or more aspects of the disclosure. A user (e.g., driver, passenger, etc.) may download an application for personalized ETA, or alternatively may download an application that includes the personalized ETA feature (among other features), onto mobile computer 110 via network 150. For instance, the mobile computer 110 may download the application from server computer 130 or storage device 140 of network 150, which may be any type of network, such as LAN, WAN, Wi-Fi, Bluetooth, etc. Similarly, the user may download the application onto an in-vehicle computer (not shown) of vehicle 120 via network 150. In some examples, the in-vehicle computer and the mobile computer 110 may be communicatively coupled to each other using a wired or wireless connection (e.g., Bluetooth). In that regard, communication between the in-vehicle computer and the mobile computer 110 may be automatically initiated when the user starts the application on the mobile computer 110, or initiates the application using the in-vehicle computer.

The mobile computer 110 may be any type of mobile device with computing capability and/or connectivity to a network, such as a laptop, Ultrabook, smartphone, PDA, tablet computer, etc. The mobile computer 110 may include at least one or more processors 112, memory 113, display 116, and interface 117. The processor 112 may instruct the components of mobile computer 110 to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores information and/or data that can be accessed by processor 112, including instructions 114 executable by the processor 112 and data 115 (which can be retrieved, manipulated and/or stored by the processor 112 in accordance with the set of instructions 114 or other sets of executable instructions). The instructions 114 may be software that can be implemented on the mobile computer 110. The data 115 may include various types of information, such as driving data associated with the user, such as driving habits, preferences, and/or tendencies, and information related to vehicle condition, etc., ETA-related information, such as real-time ETA estimations, map information, traffic information, weather conditions, distances between geographical locations, speed limits, etc. The data 115 may be transmitted to the in-vehicle computer of vehicle 120, server computer 130, and/or storage device 140 which may also store the data 115.

The display 116 may be any type of device capable of outputting and/or communicating data to a user, such as a liquid-crystal display ("LCD") screen, a plasma screen, etc. Interface 117 may be a device, port, or a connection that allows a user to communicate with the mobile computer 110, including but not limited to a touch-sensitive screen, microphone, camera, and may also include one or more input/output ports, such as a universal serial bus (USB) drive, various card readers, etc.

Vehicle 120 may be any vehicle capable of transporting one or more individuals from one geographical location to another geographical location. While FIG. 1 illustrates a sedan, it is understood that the vehicle 120 is not limited thereto and may be any type of vehicle, such as a sport utility vehicle, a pickup truck, a coupe, a self-driving car, etc. The vehicle 120 may also include different types of sensors, such as speed, engine, image sensors, to acquire data and information about the vehicle and the how the vehicle is being driven. It is understood that any reference to a "driver" or "user" in the present disclosure may also include one or more passengers. The vehicle 120 may include an in-vehicle computer with components (including a head-up display) similar to mobile computer 110, as described above, and may be communicatively coupled either directly or indirectly to the mobile computer 110 (or other connected devices on network 150). The in-vehicle computer may be, for instance, physically located within a housing of the vehicle 120, such as the dashboard or the like.

The server computer 130 may include components similar to the mobile computer 110 and in-vehicle computer of vehicle 120. The server computer 130 (and additional server computers) may be rack mounted on a network equipment rack and/or located, for instance, in a data center. Moreover, the storage device 140 illustrated in FIG. 1 may be configured to store a large quantities of instructions, data, and/or information similar to instructions 114 and data 115.

Figure 2:
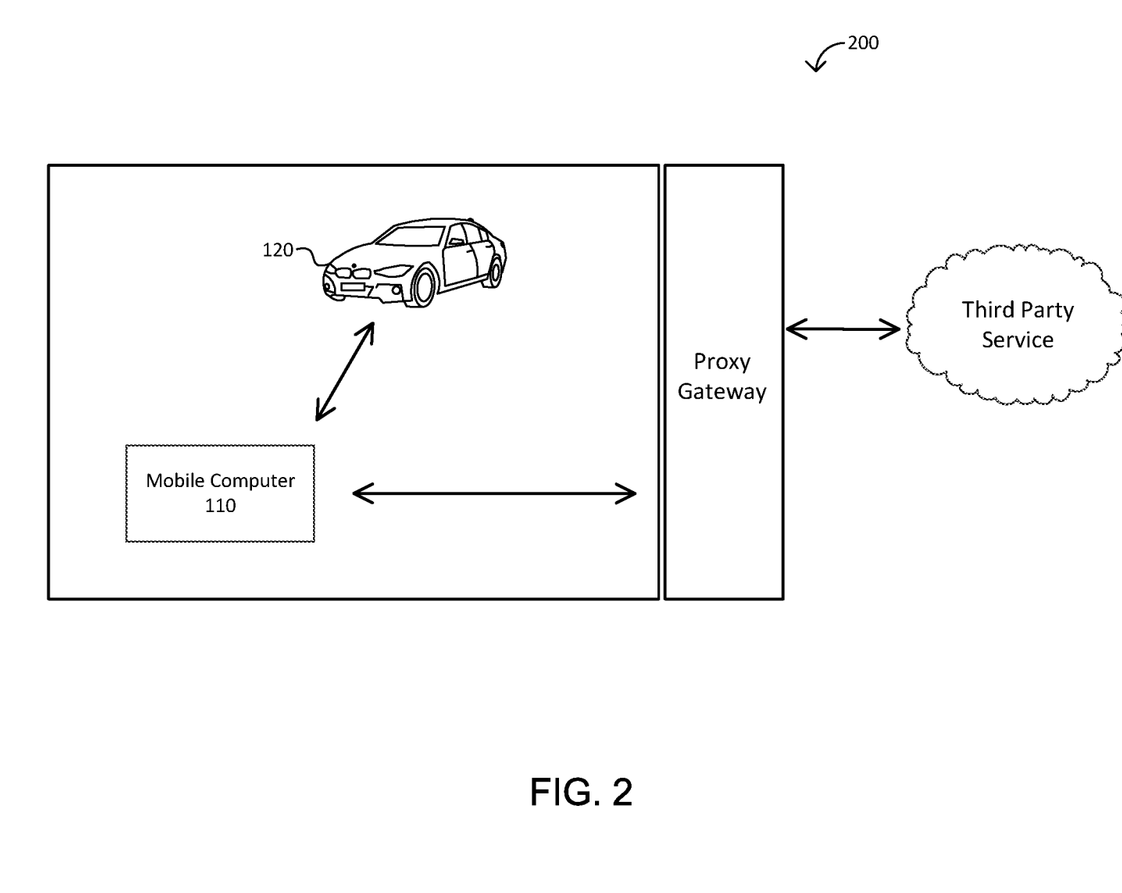
FIG. 2 illustrates a system with privacy preservation in accordance with one or more aspects of the disclosure.

FIG. 2 illustrates an example system 200 with privacy preservation in accordance with one or more aspects of the disclosure. By way of the example illustrated in system 100, FIG. 2 shows mobile computer 110 and the in-vehicle computer of vehicle 120 in communication with each other. Various types of information associated with the user and user identity may be shared between the mobile computer 110 and the in-vehicle computer. For example, during operation of the personalized ETA application, the vehicle 120 may send, via a Bluetooth connection, driving data associated with the user to mobile computer 110. This communication may be secure.

The mobile computer 110 (and/or the in-vehicle computer), however, may also need to retrieve ETA related information from third party services via third party (and possibly unsecure) networks. In one example, a proxy gateway application preserves user privacy and sensitive user data. The proxy gateway application, for instance, may be an application that runs on one or more firewall systems between two networks, such as the secure network used by the mobile computer 110 and the in-vehicle computer and the potentially unsecure third party networks. The proxy gateway application may be implemented using proxy servers, which may be servers acting as intermediaries for requests from either the mobile computer 110 or the in-vehicle computer, or both, seeking the above-information from third party servers.

Accordingly, any information that may contain user identity or other information capable of revealing the user's identity that is being transmitted out to third party networks can be anonymized by the proxy gateway application. In that regard, the third party services may not be able to build its mapping function without personal data being provided with a particular user.

Figure 3:
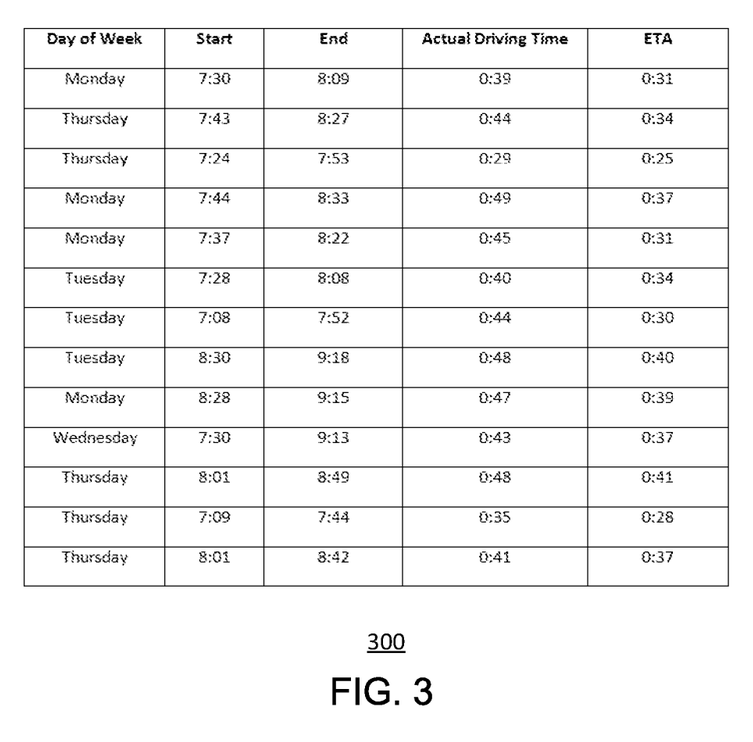
FIG. 3 illustrates a chart containing driving data and ETA related information in accordance with one or more aspects of the disclosure.
Figure 4:
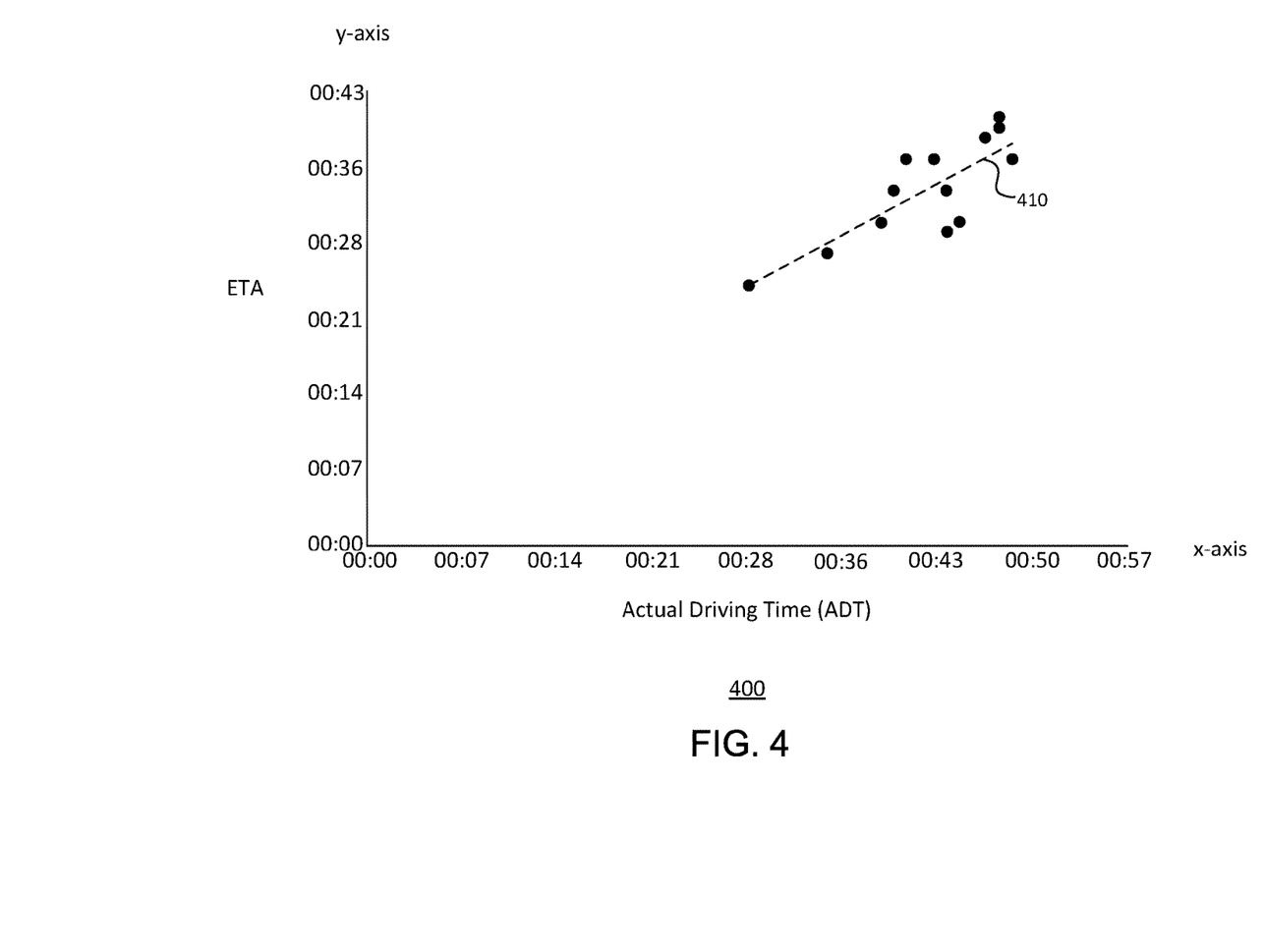
FIG. 4 illustrates a graphical plot of driving data and ETA related information in accordance with one or more aspects of the disclosure.
Figure 5:
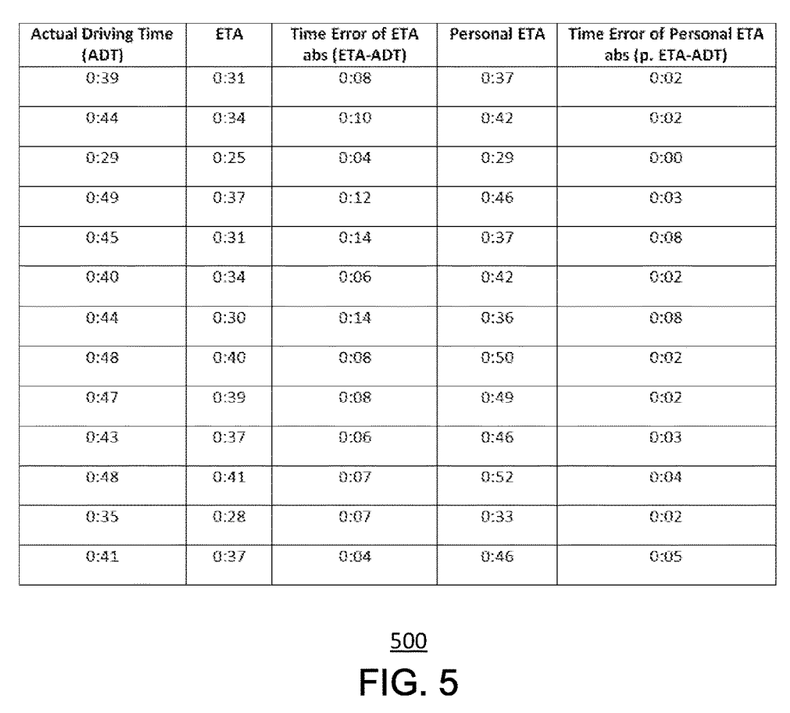
FIG. 5 illustrates a chart containing personalized ETA information in accordance with one or more aspects of the disclosure.

FIGS. 3-5 illustrate the advantages of personalized ETA over real time ETA estimations in accordance with one or more aspects of the present disclosure. By way of an example scenario, a user may drive the same route to work every morning in vehicle 120. Data may be collected and stored in memory by the in-vehicle computer of vehicle 120 (and/or by the mobile computer 110 connected to the in-vehicle computer via a Bluetooth connection) during these trips to create one or more training sets for finding predictive and personalized relationships from the collected data.

FIG. 3 illustrates a chart 300 containing data that has been collected over 13 separate, unrelated trips. As shown, the first column of the chart includes specific days that the user drove to work, the second column includes start times of each trip (e.g., moment the user may first set the transmission in the "drive" position), the third column includes the end times of each trip (e.g., moment the user may last set the transmission in the "park" position), the fourth column includes calculations of the actual driving times ("ADT") (e.g., time period between the start and end times), and the fifth column includes real time ETA estimations, such as real time ETA estimations provided by third party services via the proxy gateway, as described above. The start and end times may be detected by one or more vehicle sensors.

In the 13 trips shown in FIG. 3, it can be seen that the user tends to leave for work between 7:00 a.m. and 8:30 a.m. Even accounting for variations in the traffic conditions during each trip, it can also be seen that each of the user's actual driving times exceeds the respective real-time ETA estimation. As will be further described below, these discrepancies may result from, for example, the user driving under the posted speed limits for a vast majority of the trips, which may be considered a driving tendency associated with the user that the real-time ETA estimations do not and cannot account for.

This driving tendency, for example, other user tendencies, habits and/or preferences, vehicle performance, lane preference, etc. may be used to create a driving profile for the user along with other types of data associated with the identity of the user. Data from the user's driving profile may be also used to create a training data set. The data included in chart 300 of FIG. 3, for instance, may be part of the training data set.

FIG. 4 illustrates a regression plot 400 of the 13 actual driving times versus the respective 13 real time ETA estimations depicted in FIG. 3. As shown in FIG. 4, the actual driving times (in minutes) is plotted along the x-axis, which may be considered the explanatory variable, and the real time ETA estimations (in minutes) is plotted along the y-axis, which may be considered the dependent variable. Based on the 13 plotted data points, a linear regression line 410 having a particular regression slope may be obtained. For example, the linear regression line 410 may be represented by equation $y=0.697x+0.0032$. The value, 0.697, of the equation represents the regression slope value and may represent the "personal" factor of the linear relationship between the 13 actual driving times and the 13 respective real time ETA estimations. In other words, the regression slope may reveal some "personality" associated with the user based on the 13 plotted data points in FIG. 4.

FIG. 5 illustrates a chart 500 containing error values associated with the real time ETA estimations and error values associated with the personalized ETA times. For example, the first column includes all the actual driving times previously identified in chart 300 of FIG. 3. The second column includes all the real time ETA estimations also previously found in chart 300. The third column includes margin-of-error values (in minutes) between each actual driving time and the respective real time ETA estimation. By way of the example shown in the first row of chart 500, the difference between the actual driving time of 39 minutes and the real time ETA estimation of 31 minutes is 8 minutes, which equates to an error of approximately 20.5%. The errors can reach as high as 14 minutes. The fourth column includes "personalized" ETA times specifically tailored to the user, which may be based on, for example, the linear regression analysis in FIG. 4. In that regard, the real time ETA estimation of 31 minutes illustrated in the first row of chart 500 may be adjusted to a personal ETA value of 37 minutes. As a result, the difference between the actual driving time of 39 minutes and the personal ETA of 37 minutes is 2 minutes, which represents an error of approximately 5.1%—a significant decrease with respect to the original 20.5% error value.

As illustrated in FIGS. 3-5 and discussed above, personalizing and tailoring the ETA based on driving data associated with the user, such as the user consistently driving under the posted speed limits, will improve the accuracy of the ETA and ultimately a better driving and/or trip-planning experience for the user. FIG. 5, for instance, shows that the average error of the real time ETA estimations is approximately 20%. By contrast, the average error of the personalized ETA values in FIG. 5 is approximately 8%.

In accordance with further aspects of the present disclosure, a nonlinear mapping function, such as a model-predicted ETA function, may be used to more precisely determine and fine-tune personalized ETA. As will be further discussed below, for example, an error function that measures the mismatch between the model-predicted ETA function and an actual driving time may be minimized over a predetermined number of iterations in order to determine personalized parameters corresponding to the model-predicted function that fit a particular training data set. The determined personalized parameters may then be used to determine a personalized ETA.

By way of example, the model-predicted ETA function depends on at least a traffic situation, such as a traffic measure (T), which may represented by the following equation:

$$T = \frac{\text{Average estimated speed}}{\text{Average speed limit}} = \frac{\frac{\text{Distance}}{\text{ETA}}}{\sum_{i=1}^{L}\left(\frac{\text{Distance}_i}{\text{Distance}} \times \text{SpeedLimit}_i\right)} = \frac{\text{Distance}}{\text{ETA} \times \text{SL}}$$

"Distance" is the distance of a given route and "SL" is the average speed limit, which can be estimated across all road segments of the entire route. The speed limit may be read from metadata associated with each road segment. For instance, a long route may be split into numerous road segments to improve overall accuracy.

Variations in ETA times depend on the traffic situation. For example, there is less user variation in the worst-case traffic situation because user cannot drive faster or slower than others in the same traffic situation. In medium-level traffic situations, user variation starts increasing. In free-flow traffic situations, there is more user variation while being theoretically bounded by the speed limit.

In that regard, the non-linear mapping function, in this case, a model-predicted ETA function may be represented by the following equation:

$$ETA_p = \frac{\beta}{1 + e^{-(T*\alpha-\gamma)}} * ETA + \epsilon$$

The "personal" parameters of the above model-predicted ETA function may be described by $w=\{\beta, \alpha, \gamma, \epsilon\}$. Thus, for given data points ($ETA_p$, ETA, and T), the goal is to determine the personal parameters that can fit a training data set. The training data set may be created from data collected and stored by the in-vehicle computer of vehicle 120 and/or the mobile computer 110 and may be described by equation $\Gamma=\{Y_k, ETA_k, T_k\}$, where $k=1, 2, \ldots N$, and where $Y_k$ represents the actual driving time. In one example, to find the personalized parameters that fit the training data set, an error function that measures the mismatch between the model-predicted ETA ($ETA_p$) and the actual driving time may be minimized.

The error function may be represented by the following equation:

$$E(w) = \frac{1}{2}\sum_{k=1}^{N} \{ETA_p(w, T_k, ETA_k) - Y_k\}^2 + \frac{\tau}{2}\|w\|^2 = \sum_{k=1}^{N} E_k(w) + \frac{\tau}{2}\|w\|^2$$

$$\frac{\tau}{2}\|w\|^2$$

represents the regulation function that controls over-fitting, where $\|w\|=\beta^2+\alpha^2+\gamma^2+\epsilon^2$ and $E_k(w)=\frac{1}{2}\{ETA_p(w, T_k, ETA_k)-Y_k\}^2$.

Accordingly, by minimizing E(w) with respect to w, the personalized parameters may be estimated. Gradient descent may be used to optimize w, where:

$$w_{i+1} = w_i - n\nabla E(w)$$

$$\nabla E(w) = \begin{bmatrix} \frac{\partial E(w)}{\partial \beta} \\ \frac{\partial E(w)}{\partial \alpha} \\ \frac{\partial E(w)}{\partial \gamma} \\ \frac{\partial E(w)}{\partial \epsilon} \end{bmatrix}$$

For example, the parameter estimation for parameter $\beta$ may be based on the following:

$$\frac{\partial E(w)}{\partial \beta} = \sum_{k=1}^{N} \frac{\partial w_k(w)}{\partial \beta} + \tau\beta,$$

where $$\frac{\partial w_k(w)}{\partial \beta} = (ETA_p(w, T_k, ETA_k - Y_k) * \frac{\partial ETA_p(w, T_k, ETA_k)}{\partial \beta},$$

and where $$\frac{\partial ETA_p(w, T_k, ETA_k)}{\partial \beta} = \frac{ETA_k}{1 + e^{-(T_k*\alpha-\gamma)}},$$

and therefore $$\frac{\partial E(w)}{\partial \beta} = \sum_{k=1}^{N} \left\{err_k(w) * \frac{ETA_k}{1 + e^{-(T_k*\alpha-\gamma)}}\right\} + \tau\beta,$$

$$err_k(w) = \frac{\beta}{1 + e^{-(T_k*\alpha-\gamma)}} ETA_k - Y_k$$

represents the error of the estimated driving time and the real driving time for sample k.

In another example, the parameter estimation for parameter $\alpha$ may be based on the following:

$$\frac{\partial E(w)}{\partial \alpha} = \sum_{k=1}^{N} \frac{\partial w_k(w)}{\partial \alpha} + \tau\alpha,$$

where $$\frac{\partial w_k(w)}{\partial \alpha} = (ETA_p(w, T_k, ETA_k) - Y_k) * \frac{\partial ETA_p(w, T_k, ETA_k)}{\partial \alpha},$$

and where $$\frac{\partial ETA_p(w, T_k, ETA_k)}{\partial \alpha} = \frac{T_k * \beta * ETA_k * e^{-(\alpha*T_k-\gamma)}}{\{1 + e^{-(T_k*\alpha-\gamma)}\}^2},$$

and therefore $$\frac{\partial E(w)}{\partial \alpha} = \sum_{k=1}^{N} \left\{ err_k(w) * \frac{T_k * \beta * ETA_k * e^{-(\alpha*T_k-\gamma)}}{\{1 + e^{-(T_k*\alpha-\gamma)}\}^2} \right\} + \tau\alpha$$

In a further example, the parameter estimation for parameter γ may be based on the following:

$$\frac{\partial E(w)}{\partial \gamma} = \sum_{k=1}^{N} \frac{\partial w_k(w)}{\partial \gamma} + \tau\gamma,$$

where $$\frac{\partial w_k(w)}{\partial \gamma} = (ETA_p(w, T_k, ETA_k) - Y_k) * \frac{\partial ETA_p(w, T_k, ETA_k)}{\partial \gamma},$$

and where $$\frac{\partial ETA_p(w, T_k, ETA_k)}{\partial \gamma} = -\frac{\beta * ETA_k * e^{-(\alpha*T_k - ETA_k)}}{\{1 + e^{-(T_k*\alpha-\gamma)}\}^2},$$

and therefore $$\frac{\partial E(w)}{\partial \gamma} = \sum_{k=1}^{N} \left\{ err_k(w) * \frac{-\beta * ETA_k * e^{-(\alpha*T_k-\gamma)}}{\{1 + e^{-(T_k*\alpha-\gamma)}\}^2} \right\} + \tau\gamma$$

In yet another example, the parameter estimation for parameter ∈ may be based on the following:

$$\frac{\partial E(w)}{\partial \epsilon} = \sum_{k=1}^{N} \frac{\partial w_k(w)}{\partial \epsilon} + \tau\epsilon,$$

where $$\frac{\partial w_k(w)}{\partial \epsilon} = (ETA_p(w, T_k, ETA_k) - Y_k) * \frac{\partial ETA_p(w, T_k, ETA_k)}{\partial \epsilon},$$

and where $$\frac{\partial ETA_p(w, T_k, ETA_k)}{\partial \epsilon} = 1,$$

and therefore $$\frac{\partial E(w)}{\partial \epsilon} = \sum_{k=1}^{N} \{err_k(w)\} + \tau\epsilon$$

An algorithm may be used to perform the parameter estimations using one or more iterations. For example, the algorithm may be performed by one or more computing devices, such as the above-described in-vehicle computer of vehicle 120 and/or the mobile computer 110.

By way of example only, the algorithm starts by initializing w: $w_o = \{\beta_o, \alpha_o, \gamma_o, \epsilon_o\}$, where $\beta_o, \alpha_o, \gamma_o$ can be set to a random value, and $\epsilon_o = 0$. Thereafter, the algorithm may set i←0. Thus, for every sample in the training data set, the algorithm determines $err_k(w_i)$, and then the algorithm determines $E(w_i)$. For instance, if $(E(w_{i-1})-E(w_i))<\sigma$ (a function which controls the stop command), the algorithm sets $w^* = w_i$, where $w^*$ represents the optimized personalized parameters. Using the above-described gradient functions, the algorithm then determines $\nabla E(w_i)$ and also determines $w_{i+1} = w_i - n*\nabla E(w_i)$.

The algorithm then begins to perform the next iteration, and may now set i←i+1. At this point, a determination may be made as to whether the value of i is less than a threshold iteration number (e.g., i<Thre, where Thre represents the threshold iteration number). If i<Thre, then the algorithm again determines $err_k(w_i)$ and $E(w_i)$ for every sample in the training data set. However, if i≥Thre, then algorithm sets $w^* = w_i$ and the algorithm is stopped. The algorithm can also be stopped after one iteration if the error reduction is small, which can be based on, for instance, a threshold error reduction value. Once the {β, α, γ, ∈} parameters are estimated to values that best fit the training data set, these parameters, which may be unique to the particular user, may be used to provide the user a "personalized" ETA.

Figure 6:
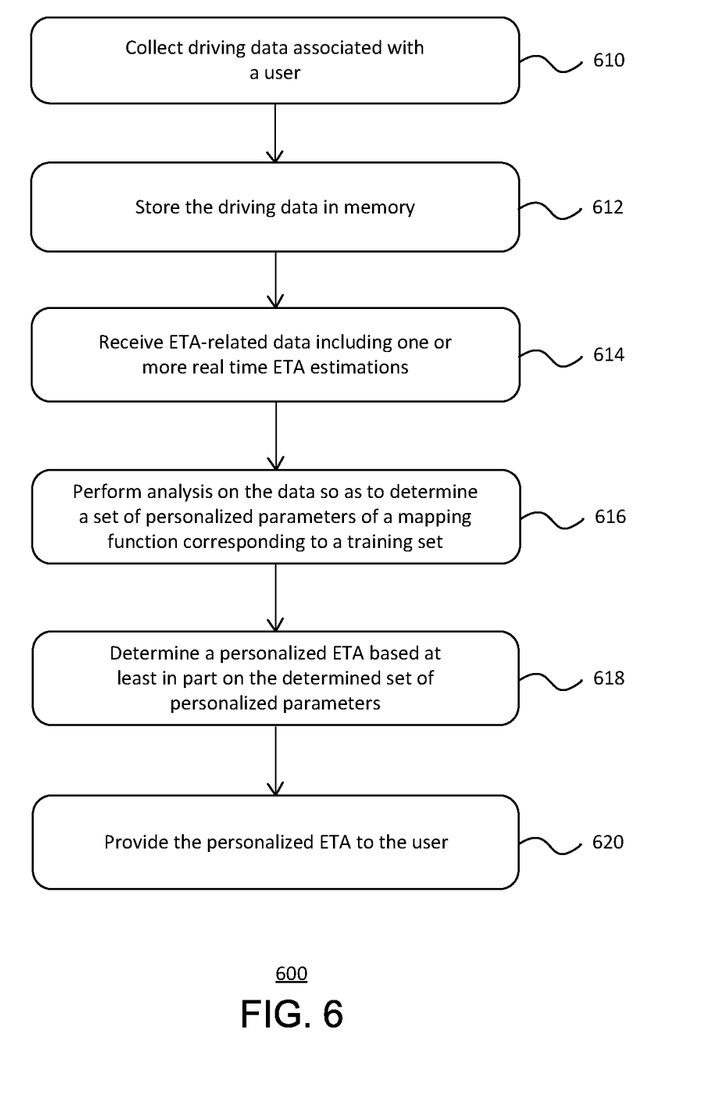
FIG. 6 illustrates a flow diagram in accordance with one or more aspects of the disclosure.

FIG. 6 illustrates an example flow diagram 600 of determining and providing to a user a personalized ETA in accordance with one or more aspects of the disclosure. The blocks 610-620 shown in FIG. 6 will be described using the system examples illustrated in FIGS. 1 and 2. In that regard, the computer performing the acts described in the respective blocks may be the in-vehicle computer of vehicle 120 or the mobile computer 110, or both.

At block 610, driving data associated with a user may be collected. For example, the data may include the actual driving times between two geographical locations along a particular route. The data may also include other types of information, such as the user's preferred lane of travel, driving tendencies (e.g., speeding up or slowing down on a road segment), vehicle conditions, etc. The data may be derived from one or more sensors of the vehicle.

At block 612, the driving data may be stored in memory of the at least one computer for later use. The at least one computer may also receive ETA-related data include one or more real time ETA estimations, such as ETA estimations provided by third party services at block 614. User privacy and information potentially identifying the user may be preserved and protected by use of a gateway proxy (as shown in FIG. 2) when communicating with the third party servers.

At block 616, the at least one computer performs analysis on the driving data and/or the ETA-related data so as to determine a set of personalized parameters of a mapping function corresponding to a training set. As discussed above, the mapping function may be the model-predicted ETA function and the personalized parameters may be the four $\{\beta, \alpha, \gamma, \in\}$ parameters. Using the determined personalized parameters, the at least one computer may then determine a personalized ETA at block 618 and provide the personalized ETA to the user at block 620.

Numerous advantages of the present disclosure, include but are not limited to, (1) providing users with more relevant and precise ETA information thereby improving the driving experience, (2) preserving and protecting user data privacy without sharing persistent personal data to third party services, (3) providing a combined ecosystem of map, location, and/or traffic information from non-personal ETA services and personal ETA information from a user profile where the data associated with the user is collected and learned over time and owned by the user and the user's trusted services, (4) being able to integrate the personalized ETA feature into other applications, (5) providing a reference algorithm and implementation while being able to implement in different variations, and (6) offering a truly personalized experience based on data that is personal and connected with the specific user (e.g., without mixing data from crowdsourced information from taxis or other transportation means) while being able to offer the user personalized ETA regardless of whether the user is driving or not or sharing track data or not.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure use terminology and acronyms that may not be familiar to the layperson, those skilled in the art will be familiar with the terminology and acronyms used herein.

The invention claimed is:

1. A method for determining and providing a personalized estimated time of arrival (ETA), the method comprising the acts of:
   collecting, using at least one computing device, driving data associated with a user including one or more actual driving times from a first geographical location to a second geographical location via a route;
   storing, using the at least one computing device, the driving data in memory;
   sending, using the at least one computing device, at least user identification information to at least one third-party network in order to receive ETA-related data associated with the user, wherein a proxy server anonymizes the user identification information before the at least one third-party network receives the user identification information;
   receiving, using the at least one computing device, the ETA-related data from the at least one third-party network based on the anonymized user identification information, the ETA-related data including one or more real time ETA estimations for the user;
   performing, using the at least one computing device, analysis on the driving data and the ETA-related data;
   determining, using the at least one computing device, the personalized ETA based at least in part on the analyzed driving data and the ETA-related data and using a non-linear mapping function that includes personal parameters that have been fit to training data collected by the at least one computing device; and
   providing, by the at least one computing device, the personalized ETA to the user.

2. The method of claim 1, wherein the at least one computing device includes one or more of the following: (i) an in-vehicle computer, (ii) a mobile computer, and (iii) a server computer.

3. The method of claim 1, wherein the act of providing the personalized ETA comprises outputting, using the at least one computing device, personalized ETA to the user via a display.

4. The method of claim 3, wherein the display is a head-up display.

5. The method of claim 1, wherein the driving data associated with the user further includes one or more of the following: (i) a driving tendency of the user, (ii) a driving habit of the user, (iii) a driving preference of the user, and (iv) a vehicle condition.

6. The method of claim 5, wherein the driving data is acquired via one or more sensors of a vehicle.

7. The method of claim 6, wherein the driving preference includes the user driving in a particular lane on more than a threshold number of occasions, and wherein the vehicle condition includes the vehicle in a drive position or the vehicle in a park position.

8. The method of claim 1, wherein the ETA-related data further includes one or more of the following: (i) static data, (ii) dynamic data, and (iii) crowd sourced data.

9. The method of claim 8, wherein the static data includes information related to the route, a distance of the route, one or more speed limits associated with the route, geometry of the route, and traffic light positions.

10. The method of claim 8, wherein the dynamic data includes information related to potential incidents, weather, change of traffic lights, and traffic flow.

11. The method of claim 8, wherein the crowd sourced data is from a plurality of other drivers and passengers.

12. A non-transitory computer-readable medium comprising a set of executable instructions, the set of executable instructions when executed by at least one processor causes the at least one processor to perform a method for determining and providing a personalized estimated time of arrival (ETA), the method comprising the acts of:
   collecting driving data associated with a user including one or more actual driving times from a first geographical location to a second geographical location via a route;
   storing the driving data in memory;
   sending at least user identification information to at least one third-party network in order to receive ETA-related data associated with the user, wherein a proxy server anonymizes the user identification information before the at least one third-party network receives the anonymized user identification information;
   receiving the ETA-related data from the at least one third-party network based on the anonymized user identification information, the ETA-related data including one or more real time ETA estimations for the user;
   performing analysis on the driving data and the ETA-related data;
   determining the personalized ETA based at least in part on the analyzed driving data and the ETA-related data and using a non-linear mapping function that includes personal parameters that have been fit to training data collected by at least one computing device; and providing the personalized ETA to the user.

13. A system for determining and providing a personalized estimated time of arrival (ETA), the system comprising:

memory;

at least one computing device executing stored program instructions to:

collect driving data associated with a user including one or more actual driving times from a first geographical location to a second geographical location via a route;

store the driving data in the memory;

send at least user identification information to at least one third-party network in order to receive ETA-related data associated with the user, wherein a proxy server anonymizes the user identification information before the at least one third-party network receives the user identification information;

receive the ETA-related data from the at least one third-party network based on the anonymized user identification information, the ETA-related data including one or more real time ETA estimations for the user;

perform analysis on the driving data and the ETA-related data;

determine the personalized ETA based at least in part on the analyzed driving data and the ETA-related data and using a non-linear mapping function that includes personal parameters that have been fit to training data collected by the at least one computing device; and provide the personalized ETA to the user.

* * * * *